July 11, 1939.  J. E. MASON ET AL  2,165,397
CONTROL FOR STREAM-CONVEYED MATERIAL
Filed Jan. 19, 1937  2 Sheets—Sheet 1

INVENTOR.
JOHN E. MASON and
BY FREDERICK H. BALLOU
ATTORNEY.

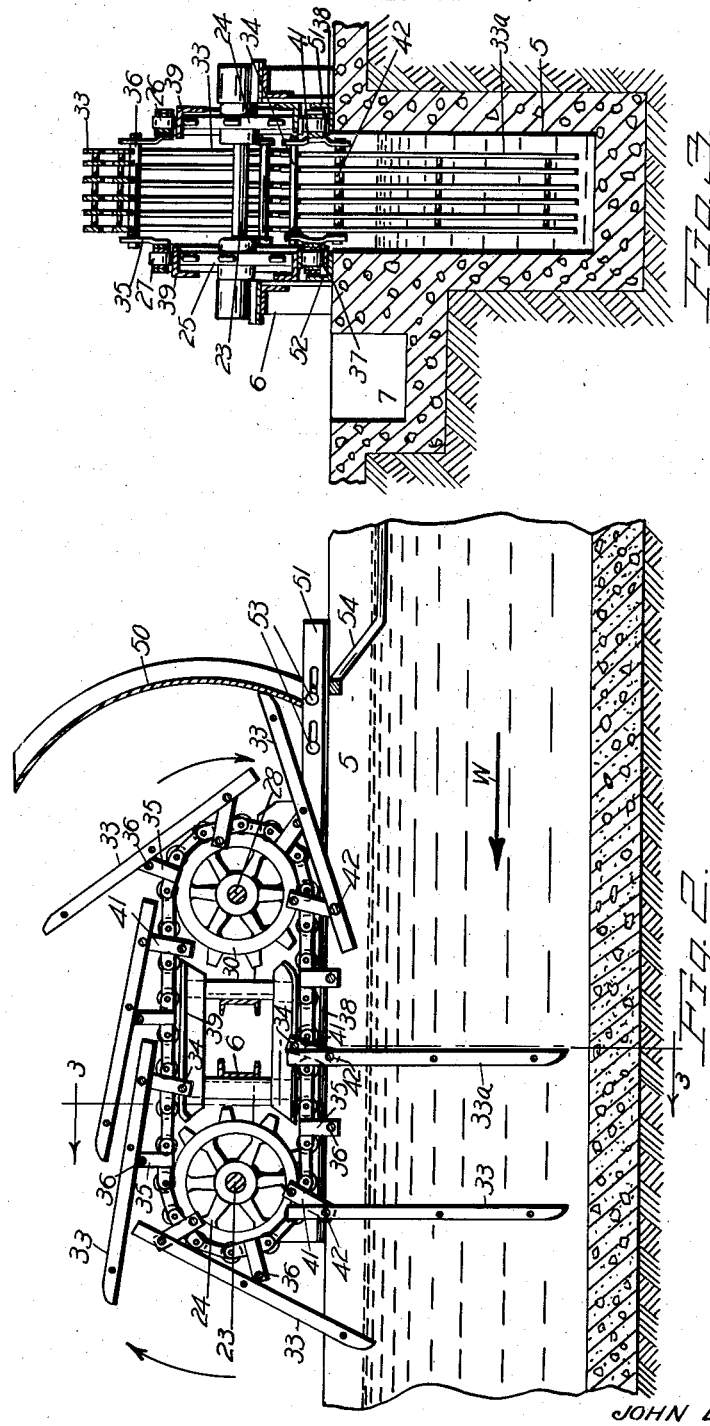

Patented July 11, 1939

2,165,397

UNITED STATES PATENT OFFICE 2,165,397

CONTROL FOR STREAM-CONVEYED MATERIAL

John E. Mason, Denver, Colo., and Frederick H. Ballou, Vancouver, Canada, assignors to The Stearns-Roger Manufacturing Company, Denver, Colo., a corporation of Colorado Application January 19, 1937, Serial No. 121,312

18 Claims. (Cl. 302—14)

This invention relates to improvements in apparatus for feeding sugar beets and the like from storage to the processing factory.

In the beet-sugar industry it is the usual practice to store the beets as they are delivered from the growers, in a convenient location adjacent to the processing factory. The harvesting and delivery of the beets to the factory is accomplished in a relatively short period of time so that large amounts of beets are accumulated and stored to be later processed into refined beet-sugar and other products.

The beets require careful handling so that they will not be broken open or otherwise damaged, and to this end and for other reasons, the beets are usually transported from the storage to the factory proper, by means of a stream of water in a flume by which the beets are floated or flushed to the desired point of delivery. According to the present invention, apparatus may be built to regulate the flow of the beets through the flume as required, or such apparatus may be used to control the flow of any other similar material that is transported by means of a stream of water in a suitable conductor.

It is an object of the present invention to provide apparatus whereby the flow of sugar beets or the like in a stream of water may be regulated as required.

Another object of the invention is to provide such apparatus that can be controlled from any convenient remote station as desired.

A further object of the invention is to build apparatus of this character that will not damage the beets or other material being transported.

A still further object is to construct apparatus that will govern the movement of solids in a stream while permitting the continuous flow of the stream.

Other objects and advantages will be more fully disclosed in the following description and in the drawings, wherein like parts have been similarly designated and wherein;

Figure 2 is a longitudinal section taken along the line 2—2 of Figure 1; and

Figure 3 is a cross section taken on the line 3—3 of Figure 2.

Figure 1:
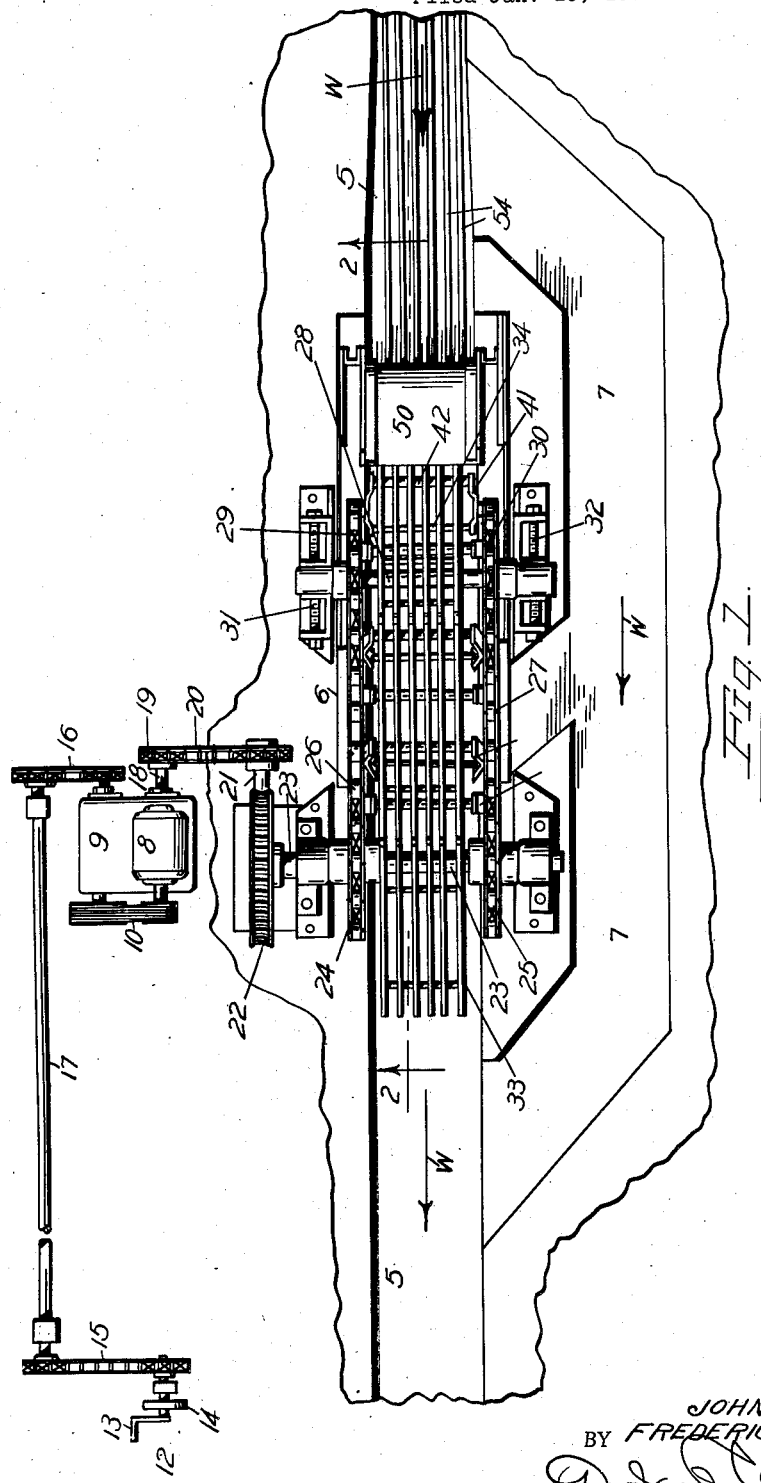
Figure 1 is a plan view of apparatus built according to the invention.

Reference character 5 denotes a flume over which is mounted an apparatus built according to the invention and designated as a whole by 6. A by-pass 7 will conduct water around the apparatus under conditions that will be explained below. The direction of flow of the water is indicated by arrows "W". The flume may be in the form of a concrete lined ditch, as illustrated or it may be of wooden construction below or above the ground-surface, or any other suitable form.

A suitable source of motive power, such as a motor 8 drives a variable-speed transmission unit 9 through suitable belting 10. The output-speed of the transmission unit may be selectively governed by an operator at a remote-control station 12, using a hand crank 13 adjacent a calibrated dial 14. The crank operates suitable sprockets, chains 15 and 16 and a shaft 17, to transmit governing movements to the transmission unit.

The output shaft 18, of the transmission unit, carries a sprocket 19 which drives a chain 20 to deliver driving torque to a worm shaft 21 that drives a worm wheel 22 on a main shaft 23 of the apparatus. The shaft 23 carries sprockets 24 and 25 that drive roller chains 26 and 27 respectively, and another shaft 28 carries sprockets 29 and 30 that correspond to the sprockets 24 and 25 and are driven by the roller chains 26 and 27 respectively. The shafts 23 and 28 span the flume and are journaled on either side thereof in any convenient manner, means as shown at 31 and 32 being provided for tightening the chains 26 and 27 as required.

Rigidly mounted on the chains 26 and 27, at spaced intervals, are arms 41 in corresponding relation on each chain. A rod 42 is carried by each pair of corresponding arms, and on each rod is pivoted a rake 33 so that it is in alinement with the flume. A bar 34 is also carried by each pair of oppositely disposed and corresponding arms 41, the rods 42 and the bars 34 being located adjacent the opposite ends of their supporting arms. Between the spaced arms 41 are brackets 35 also rigidly mounted on the chains and in corresponding relationship on the opposite chains. Each pair of brackets carries a rest-bar 36. Rails 37 and 38 guide the rollers of the chain along their lower position and rails 39 support them along the upper portion of their travel. A curved guard 50 is movable along angle-irons 51 and 52 and may be anchored in a selected position by means of bolts 53.

Operation

In operation the apparatus is located over the flume that conducts the material-carrying stream. The sprockets and roller chains 26 and 27 are rotated in a clockwise direction, as shown in Figure 2. The pivoted rakes rest on the rest-bars 36, as they travel along the uppermost part of their path. As they travel downwardly around the right-hand sprockets they are engaged on their outer ends by the guard 50 and are thereby prevented from falling on the beets or other material in the stream which they would otherwise do when their respective pivotal axes cross their centers of gravity. Such an impact might damage the beets. The guard allows the rakes to descend into the water slowly and with very little momentum and as they pass from contact with the guard they assume a vertical position, as shown at 33a in Figure 2.

The speed at which the rakes advance in the path of the stream will govern the speed of the beet-movement, or the rakes may be stopped in the stream and thereby stop the movement of the beets entirely. The rakes are of a size and shape to fit into the cross section of the flume to have the effect of a screen thereacross. When the travel of the rakes is slower than the travel of the stream, pressure will be exerted upon the rakes in the direction of the stream-flow. This force tends to rotate the rakes forward so that their upper ends bear against the bars 34 to make a cantilever of each rake to resist the forward rake-rotating force and thus hold back the flow of solid material in the stream.

The rakes are of an open grill-like construction to permit the water to flow through but when a quantity of beets is dammed up against the rakes, the water-flow is naturally retarded and the by-pass 7 is therefore provided to form a spill-way for dammed-up water.

A series of bars 54 at about the normal surface level of the water in the flume, are arranged parallel to the direction of flow and form a grate to keep solid material that is in the stream from rising to a point where it might by-pass the apparatus with the water, in the case of a partial damming of the stream. An operator at any convenient location can control the speed of the rake-travel and therefore the speed of beet-delivery, by means of the control-crank 13, as explained above.

What we claim and desire to secure by Letters Patent is:

1. The combination with a stream of predetermined velocity in which sugar beets or like solids are conveyed, of a rake-carrier having rake members movable through the stream and held against tilting movement therein in a position to oppose the movement of said solids therein, and mechanism for controlling the operation of the carrier whereby to move the solids independently of the velocity of the stream.

2. The combination with a stream of predetermined velocity in which sugar beets or like solids are conveyed, of a rake-carrier having rake members movable as cantilevers through the stream in a position to control the movement of said solids therein, and mechanism for moving the solids through the intermediary of the carrier at a velocity different than the velocity of the stream.

3. The combination with a stream of predetermined velocity in which sugar beets or like solids are conveyed, of a rake-carrier having rake members movable through the stream in a position to control the movement of said solids therein, and variable-speed mechanism for moving the solids through the intermediary of the carrier at selective velocities in the stream.

4. In apparatus for controlling the flow of solids in liquids, two shafts, two sprockets on each shaft, two chains carried by the sprockets, rake-members pivoted to the chain for disposition in a liquid, rake rests on the chain, stops carried by the chain to limit forward pivotal movement of the rakes, and mechanism in driving connection with one of said shafts.

5. In apparatus for controlling the flow of solids in liquids, two shafts, two sprockets on each shaft, two chains carried by the sprockets, rake-members pivoted to the chain, for disposition in a liquid, rake rests on the chain for limiting pivotal movement of the rake in one direction, stops carried by the chain in a position to limit pivotal movement of the rake in the opposite direction, and mechanism in driving connection with one of said shafts.

6. The combination with a flume in which solids are conducted in a moving stream, of mechanism for controlling the movement of solids in said stream, a by-pass for the stream having its entrance in proximity to said mechanism and near the normal liquid level of said stream, and a grate in the stream adjacent the entrance, positioned to act on solids in the stream and force them to pass to the mechanism at a lower level than the entrance.

7. In apparatus for the control of stream-conveyed materials, a channel for a conveying stream, a rake-carrier movable along the channel substantially parallel to the surface of the stream, rakes on the carrier positioned in the stream during said parallel movement, and mechanism for moving the carrier at a substantially uniform speed.

8. In apparatus for the control of stream-conveyed materials, a channel for a conveying stream, an endless rake-carrier disposed along the channel, rakes on the carrier movable in the channel substantially parallel to the surface of the stream, and mechanism for moving the carrier at a substantially uniform speed.

9. In apparatus of the character described a pair of shafts, sprockets on the shafts, conveyor-chains carried by the sprockets, rakes pivoted to the chains, a rake-rest on the chains for each rake, a bar to limit the pivotal-movement of each rake whereby the rake will resist forward pivotal force of the material, a variable-speed mechanism for driving one of the shafts, and means for governing the driving speed from a remote-station.

10. The combination with a material-conducting flume having a by-pass, of a movable rake-carrier at the by-pass, rakes on the carrier, mechanism for driving the carrier, and a grate for withholding conducted-materials from entering the by-pass.

11. In apparatus for the control of stream-conveyed materials, a channel for a conveying stream, a rake-carrier movable along the channel, rakes pivoted to the carrier and movable in the channel substantially parallel to the surface of the stream, and means for limiting pivotal movement of the rakes in the direction of the stream-flow.

12. In apparatus for the control of stream-conveyed materials, a channel for a conveying stream, an endless rake-carrier mounted above the channel, rakes pivoted to the carrier whereby they are moved into and out of the stream, means limiting the pivotal movement of the rakes in the direction of the stream-flow, and a guard to retard the entrance of the rakes into the stream.

13. In apparatus for the control of stream-conveyed materials, a conveying stream, an endless rake carrier adjacent the stream with a stretch thereof moving in the direction of stream-flow over the stream, rakes pivoted to the carrier whereby they are moved in the stream in the direction of the stream-flow, and means limiting the pivotal-movement of the rakes in the direction of the stream-flow.

14. Apparatus for the control of movement of sugar beets in a moving stream comprising a flume for the stream, a rake-element in the stream movable parallel to the surface thereof and adapted to control the movement of the beets independently of the stream, and mechanism for moving the rake-element at a selected speed.

15. The combination with a flowing stream conveying sugar beets or the like, of a rake-element across the stream movable parallel to the surface thereof and adapted to retard the movement of the beets, and mechanism to move the rake-element at a selected speed.

16. In combination, a flume to carry a flow of water and objects in and moved along by the water, and a driven structure mounted in the flume and arranged to allow of a substantially unrestricted flow of water but restricting the movement of the objects in the water to an extent determined by the speed of the structure.

17. In combination, a flume to carry a stream of water, and a driven element having arms mounted for movement into the stream about a horizontal axis and arranged to permit a substantially unrestricted flow of the water but restricting the movement of objects carried by said stream, according to the speed of the element.

18. In apparatus of the character described inclusive of conveyor-carried pivotal rakes adapted to be moved into a stream carrying objects, means for retarding the entrance of said rakes into the stream, whereby the probability of damage to the objects is reduced.

JOHN E. MASON.
FREDERICK H. BALLOU.